Feb. 5, 1935.    B. G. KLUGH    1,989,756
PROCESS OF PRODUCING CONCENTRATED FERTILIZER
Filed Aug. 22, 1931    2 Sheets-Sheet 1
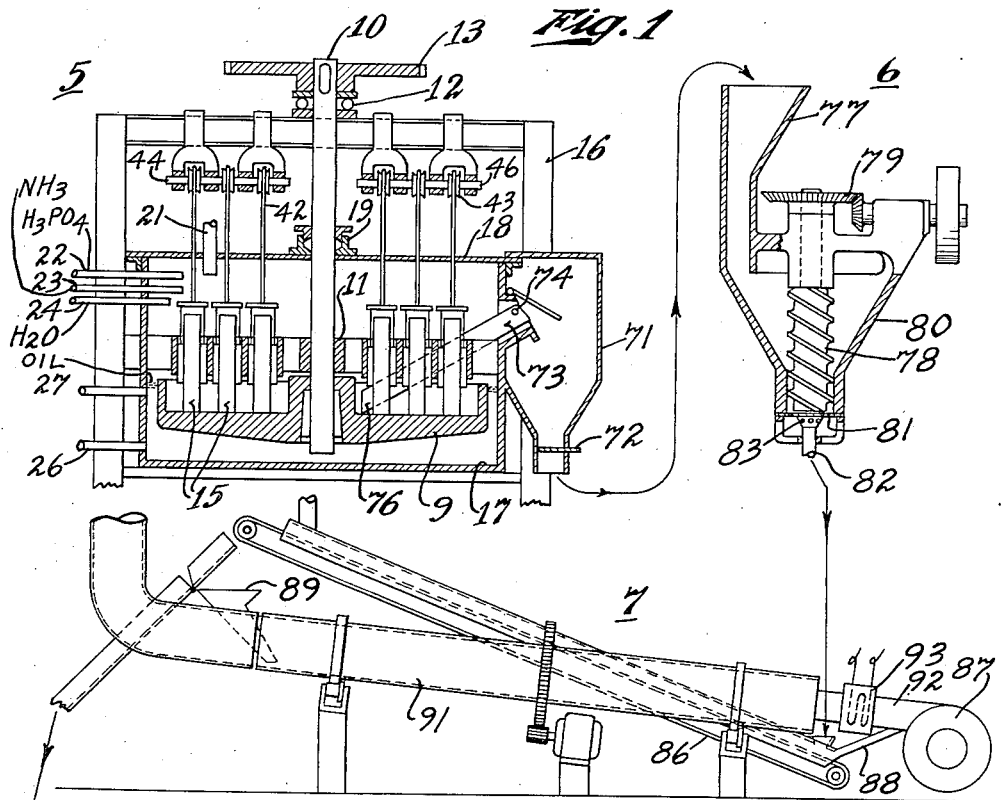
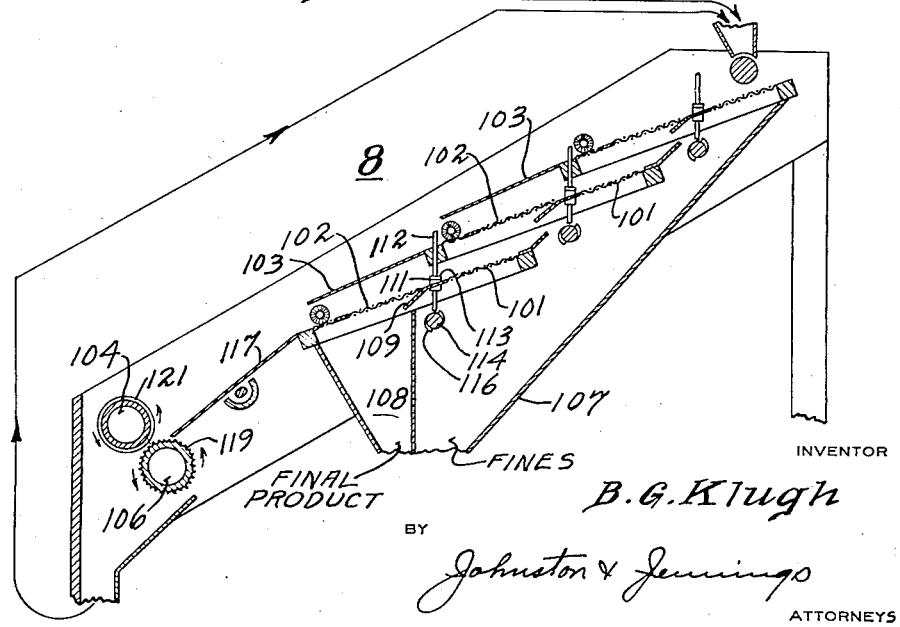
INVENTOR
B. G. Klugh
BY
Johnston & Jennings
ATTORNEYS

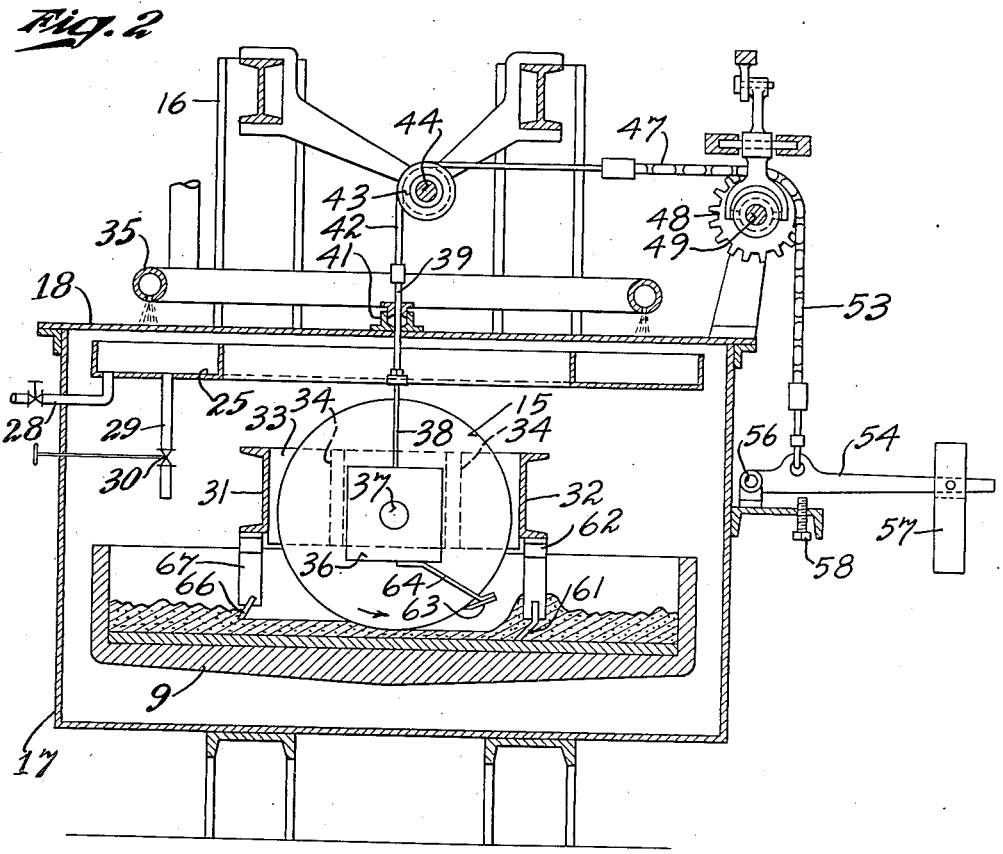

Patented Feb. 5, 1935

1,989,756

UNITED STATES PATENT OFFICE 1,989,756

PROCESS OF PRODUCING CONCENTRATED FERTILIZER

Bethune G. Klugh, Birmingham, Ala., assignor to Swann Fertilizer Company, a corporation of Delaware Application August 22, 1931, Serial No. 558,669

23 Claims. (Cl. 71—9)

This invention relates to the preparation of fertilizer materials and forming them into aggregate particles so they may be most advantageously and efficiently applied to the soil.

It is obvious that when solid fertilizer material is used in soil application, the most ideally effective fertilization results are obtainable where each plant is supplied with the predetermined requirement of plant nutrients as relates to total quantity and also to proper ratio thereof. It is well known that many fertilizer materials are very deficient in the physical characteristics necessary to meet these requirements for commercial scale agricultural application. These deficiencies exist in many fertilizer materials and arise from several inherent properties thereof. They affect the proper application of the fertilizer in many cases through segregation of the plant nutrient compounds, through caking tendencies, and also through great variation of particle size in the aggregate, thereby inhibiting uniform quantitative distribution.

The segregation tendencies have been found to be characteristic of substantially all salts used as fertilizer materials where effort is made to mix two or more of such salts in loose crystalline aggregate.

The caking tendency or the tendency to form hard and irregular lumps or masses of mixed salts often arises from the coating of the surfaces of the crystals with a film of water from the atmosphere. This film of water naturally produces a saturated solution of the salt on which it is precipitated. Where two or more crystals of different salts are in contact, there is so formed a eutectic solution of the salts involved, giving increased relative quantity of the saturated solution, which accelerates accumulatively the tendency for coherence of the crystals to form lumps and large hard firm aggregate masses. The collection of water from the atmosphere by the said crystals further increases with the areas and minute surface irregularities of the crystals or individual aggregates in such contact.

The lack of uniform particle size in loosely mixed crystalline salts, especially in commercial quantities of fertilizer, is a natural sequence, in that neither the particular salt nor the several salts involved occur or are produced within the degree of uniform size or shape of particle required for accurate quantitative fertilizer application to the soil.

It is the purpose of the hereindescribed invention to produce a fertilizer product completely obviating the effects of the inherent undesirable influences aforedescribed, with a resulting accurately and controllably drillable, practically non-hygroscopic, non-segregative, effective fertilizer, and simultaneously to effect marked economies in the chemical and mechanical steps of fertilizer material production.

In this process, I may start with either the salts of nitrogen, phosphorus, potassium, calcium, and other elemental plant nutrients, or the basic materials or both forms. For instance, take for example, the assumption that it is desired to make a fertilizer of high concentration, containing:

8 per cent nitrogen (N) in ammonia combination 4 per cent nitrogen (N) in nitrate combination 32 per cent phosphoric acid ($P_2O_5$)

20 per cent potash ($K_2O$)

Assuming further, for illustration, that for this desired production there is available potassium nitrate ($KNO_3$) containing 14 per cent nitrogen (N) and 45 per cent potash ($K_2O$) muriate of potash (KCl) containing 50 per cent potash ($K_2O$) diammonium phosphate $(NH_4)_2HPO_4$ containing 20 per cent nitrogen (N) and 53 per cent $P_2O_5$, and monoammonium phosphate $(NH_4)H_2PO_4$ containing 12 per cent nitrogen and 60 per cent $P_2O_5$. It is obvious that the above example of fertilizer mixture may be made from the salts of above analysis in the following proportion which, for reference in subsequent description herein, we call Case A—

| | Parts |
|---|---|
| $KNO_3$ | 28.5 |
| KCl | 15.5 |
| $(NH_4)_2HPO_4$ | 17.5 |
| $(NH_4)H_2PO_4$ | 38.5 |

The same analysis of the desired mixture will be obtained from the above specified potash salts and a combination of ammonia ($NH_3$) and phosphoric acid. For sake of further illustration, assume the phosphoric acid available for this mixture to contain 64% $P_2O_5$. The ammonia in anhydrous form will of course be substantially 100% $NH_3$. If the ammonia be in aqua form, the distillation thereof will give off water vapor and substantially pure $NH_3$. With these materials the same hereinabove mentioned mixture can be made with the following proportions which, for reference in subsequent description, we call Case B—

|  | Parts |
|---|---|
| $KNO_3$ | 28.5 |
| $KCl$ | 15.5 |
| $NH_3$ | 9.6 |
| $H_3PO_4$ (64% $P_2O_5$) | 50.0 |

Starting with either of the above-described raw materials, the end product will be of substantially the same analysis of nitrogen, phosphoric acid, and potash.

The two foregoing described sets of raw materials are of course typical of only one particular fertilizer ratio, and are cited for the particular purpose of elucidating the illustration of this process.

For purpose of description of this invention, it may be considered as in four serial steps. These are:

Step I

Preparation of the proper paste form of the materials.

(Alternative 1) For "Case A" above in substeps
   (a) Grinding of salts already produced.
   (b) Wetting regulation and kneading.
(Alternative 2) For "Case B" above.
   (a) Grinding of potash salts.
   (b) Addition and combination of phosphoric acid and ammonia.
   (c) Wetting regulation and kneading.

Step II

Forming of paste from Step I into small cylindrical or polygonal shapes of uniform diameter.

Step III

Drying and hardening of the cylindrical or polygonal shapes from Step II.
   (a) Primary stage of cooling, partially drying and hardening the formed aggregates.
   (b) Secondary stage of removing substantially all hygroscopic water from the formed aggregates.

Step IV

Sizing the dried cylindrical or polygonal shapes into uniform length.
   (a) Breaking.
   (b) Screening.

Each and all of the foregoing steps with one or the other of the substeps of Step I are essential for the production of this fertilizer in the desired form specified in this invention.

In the accompanying drawings, forming a part of this application:

Fig. 1 is a diagrammatic view illustrating the manner of carrying out my improved process;

Fig. 2 is a sectional view illustrating features of the improved combined mixing, grinding and kneading apparatus preferably employed with my improved process and including means whereby the treatment of the materials may be readily varied; and Fig. 3 is a detail view showing means whereby the pressure on materials under treatment may be varied.

In carrying out my process, the raw materials consisting of plant nutrient salts in a solid form, or raw materials consisting of ammonia and phosphoric acid employed alone or in connection with plant nutrient salts, are introduced into a combined grinding, neutralizing, mixing and kneading apparatus indicated generally by the numeral 5. In this apparatus the raw materials are converted into a homogeneous uniform paste of salts with a saturated solution thereof. When this step of the process is completed the material is removed from the combination apparatus 5 and transferred by any suitable means to an extrusion machine indicated generally by the numeral 6. In the extrusion machine, the paste is converted into elongated sections of uniform diameter and discharged therefrom to a cooling and drying apparatus 7. After the salts are thoroughly dried, they are transferred to a combined screening and breaking apparatus 8 in which the extruded bodies are cut into uniform length particles and the fines removed and returned to the apparatus 5 for further treatment, the finely dried particles of uniform length being then ready for packing and shipment.

The combined grinding, neutralizing, mixing and kneading apparatus 5 comprises a rotatable mixing pan 9 supported by a shaft 10 mounted in bearings 11 and 12 and driven by any suitable means through a power transmitting wheel 13.

Mounted in the pan 9 are a plurality of muller rollers 15 which are adapted to grind and knead the plant nutrient salts under treatment.

The combination apparatus 5 further comprises a supporting frame structure 16 comprised of suitable structural frame members upon which is mounted an enclosing hood 17 having a pressure tight cover 18, enclosing the rotating pan 9 and rollers 15. The shaft passes through the cover 18 of the hood 17 and is provided with a stuffing box 19 to prevent the escape of pressure from within the hood. An inlet 21 for solid materials is provided in the cover 18 of the hood 17 while separate inlets 22, 23, and 24 are provided for the introduction of liquid and gaseous constituents of the fertilizer, such as water, phosphoric acid, and ammonia. In the lower part of the hood 17, I provide inlet 26 and outlet 27 for cooling water or for heat transfer medium as the case may be, so that the temperature to which the reaction proceeds may be controlled.

Where the process is carried out by reacting phosphoric acid and ammonia, there is introduced into the hood 17 a considerable amount of water with the phosphoric acid, the amounts varying with the strength of the acid. The heat of reaction in the pan 9 serves to evaporate this water and it ascends in the form of vapor to the upper part of the hood 17.

In order that the excess of this water may be removed from the system and that needed for forming a paste may be utilized as required, I provide a condensing means which may consist in a circular reservoir 25 mounted in the hood 17 beneath the lid 18. A conduit 28 leads from this reservoir to the exterior of the hood for removal of excess water. A second conduit 29 having a valve 30 operable from the exterior of the hood is directed toward the pan 9 whereby water in the reservoir 25 may be returned to the pan 9 as needed. A cooling spray 35 is arranged above the cover 18 to cool and condense the water vapor which then falls into the reservoir 25.

It will be found in carrying out the process that it is usually necessary to maintain water in the hood 17 up to the level of the outlet 27 for cooling water. When carrying out the process with gaseous ammonia and phosphoric acid it is obvious that some means must be provided whereby the gaseous ammonia will not contact with the cooling water. This may be accomplished by providing a layer of oil on top of the water within the hood 17 as indicated by the legend in the drawings.

In order that the neutralizing, grinding, mixing and kneading of the various constituents of the fertilizer may be carried out in one operation, it is necessary that the rollers 15 and the adjuncts of the pan 9 be so designed that the materials may receive variable treatment. Referring to Fig. 2 of the drawings, I show a means whereby this treatment may be carried out. Extending across the hood 17 and joining the framework 16 are channels 31 and 32. Extending across between the channels 31 and 32 and joined thereto are a plurality of cross members 33 which are each provided with vertical guides 34. Mounted in the vertical guides 34 are bearings 36 in which are mounted shafts 37 for the muller rollers 15, each roller being mounted on an individual shaft 37 and having individual bearings 36 free to move vertically within the guides 34.

The bearings 36 are suspended by means of stirrups 38 having joined thereto rods 39 which extend through the cover 18 of the hood 17 and surrounding which are stuffing boxes 41 which prevent the escape of pressure from the hood 17. Joining the rods 39 are cables 42 which pass over sheaves 43 mounted freely on shafts 44 and 46.

The cables 42 are joined to sprocket chains 47 which pass over sprockets 48 mounted on a counter-shaft 49. The shaft 49 may be rotated by means of a worm and worm gear assembly 51 through a disengageable clutch 52, by which means all of the rollers 15 may be simultaneously raised out of engagement with the materials in the pan 9.

Ordinarily, when the process is being carried out, the rollers 15 are lowered to engage with the materials in the pan 9 for grinding and kneading them. I have found that it is necessary, as hereinafter described, to vary the pressure of the rollers upon the material in the pan, depending upon the extent to which the process has gone and the materials being treated. This is accomplished by extending the sprocket chain 47 downwardly at 53 to connect with a scale beam 54 pivoted at 56 and provided on its outer end with a movable weight 57. With this arrangement, the pressure applied by any one of the rollers 15 may be varied to that required. An adjusting screw 58 mounted beneath the scale beam 54 provides means whereby the travel of the beam 54 may be limited.

In the carrying out of the process, it will be found that there is a tendency for the mixed salts, as they are ground and kneaded, to stick to the bottom of the pan 9 and to the rollers 15. I accordingly provide scrapers 61 suitably supported by straps 62 from the channels 32 which scrape the material from the bottom of the pan 9 and divert it into the paths of the succeeding rollers as the pan revolves. Other scrapers 63 are supported by straps 64 from the bearings 36 and serve to scrape the salts off the rollers 15. It is also preferable to provide levelers 66 supported by means of straps 67 from the channels 31. The provision of the scrapers 61 and 63 and the levelers 66 provide means whereby alternate portions of the mass of the solid under treatment are alternately subjected to a kneading action in which the salts are subjected to pressure followed by a release of said pressure.

Joined to the side of the hood 17 is an enclosed chamber 71 opening into the hood 17 and controlled by suitable outlet valves 72. Mounted in the opening into the hood 17 is a scoop 73 pivoted at 74 whereby its inner end 76 may be lowered to rest upon the bottom of the pan 9. When the materials have been treated sufficiently, as hereinafter described, the scoop 73 is lowered with the pan 9 still rotating whereupon the materials within the pan are delivered up scoop 73 and into the chamber 71.

From the chamber 71, the materials are conveyed by any suitable means to a hopper 77 connected to the extrusion apparatus 6. Extrusion apparatus 6 preferably comprises a vertical screw 78 driven through means of gearing 79 by any suitable power means not shown. Surrounding the screw 78 is a feed chamber 80 and at the lower end of the screw 78 is a perforated plate 81 through which the extruded bodies of the paste pass. Centrally of the perforated plate 81 and underneath the same is a conduit 82 terminating in perforations 83 through which cold air is blown as the extruded bodies emerge from the plate and which drives off sufficient surface moisture whereby the extruded bodies may be further handled without sticking together.

From the extrusion machine 6 the extruded bodies of mixed salts pass to an enclosed belt conveyor 86 through which is blown a stream of cold air supplied by fan 87 through a branch conduit 88. During this part of the treatment, the extruded bodies lie on the belt conveyor in a state of relative quiescense to each other and are further hardened and dried. From the belt conveyor 86, the extruded bodies are delivered into a hopper 89 leading into a rotary drier 91. A branch conduit 92 from the fan 87 leads through a heating means 93 whereby heated air is supplied to the rotary drier 91.

During this part of the treatment, the surface moisture on the extruded bodies is driven off and upon passing through the rotary drier 91 they are again delivered to the covered conveyer 86 and subjected to a further treatment of cold air which drives out the occluded moisture from the interior of the extruded bodies, whereupon they are again delivered to the rotary drier 91 for a further treatment of heated air. This treatment with alternate currents of heated and cold air is continued until the extruded bodies are thoroughly dry, whereupon they are delivered to the combined screening and breaking machine 8.

At this point in the treatment of the dried extruded bodies, it will be found that they are of variable lengths including a small percentage of fines resulting from the agitation and drying heretofore described. I have found that in order to provide a product which may be evenly distributed on land by means of farm drilling machinery, the particles of mixed salts should be of uniform size, which size I have found to be of a length approximately 1½ times the diameter of the particles. The treatment afforded in the combined breaking and screening apparatus 8 is one which removes the fine particles, screens out particles which are already of proper lengths, and breaks the overlength bodies into particles of substantially uniform length.

To this end, the combined apparatus 8 comprises a plurality of superimposed and overlapping screen assemblies. Each of these screen assemblies comprises a section of relatively fine mesh 101, followed by a section of relatively coarse mesh 102 through which particles of the length desired are adapted to pass, and followed by a plate 103 over which the oversize particles pass to be received by breaker rolls 104 and 106. Beneath the screens are two hoppers 107 and 108 into which the fines and the final product respectively are delivered.

Extending across each of the screen assemblies, at the juncture of the fine and relatively coarse section is a plate 109 in which is mounted a vertical bushing 111. Extending upwardly through the bushing 111 is a rod 112 carrying a weight, such as a nut, 113. Beneath each of the screen units is a rotary shaft 114 having cams 116 adapted to raise the rods 112 and allow them to fall by gravity downwardly to permit the weights 113 to strike the bushing 111 and vibrate the screen unit. The fine materials fall through the screen section 101 into the hopper 107 while the particles of substantially uniform length fall through the screen section 102 onto the next succeeding fine section 101.

This screen section is vibrated in a manner similar to that just described, whereupon any fine material remaining in the mass of particles passing through the upper section 102 are removed and the longer particles pass to the intermediate screen section 102. Particles passing through the intermediate screen section 102 fall again on a fine section 101 of a lower section of screen assembly and are given further treatment. If any overlength particles have passed through the upper screen section 102 they pass off the intermediate section 102 onto the intermediate plate 103 to be delivered to the breaker rolls 104 and 106. The particles of substantially uniform length are finally passed through the lower screen section 102 into the hopper 108 by reason of the vibration of the lower screen section as already described.

The overlength extruded bodies pass over a plate 117 to the breaker rolls 104 and 106. These breaker rolls 104 and 106 comprise rotating cylindrical bodies, the body 106 being provided with longitudinal grooves 119 separated by relatively sharp ridges and the body 104 being provided with similar grooves 121 transverse to the axis of the body. The roll 104 is preferably mounted slightly rearwardly of the roll 106 so that a line joining the axes of the two bodies makes an angle of approximately 45 degrees with the vertical.

The upper breaker roll 104 is rotated in the same direction as the roll 106 and preferably at a speed substantially ten times that of the lower roll. The action of the roll 104 on loose material approaching the roll is to tend to throw it away from the rolls and also to cause it to assume a position parallel to the longitudinal axis of the roll 106 whereby the elongated extruded bodies are received in the longitudinal grooves of the roll 106 and do not pass between the rolls except when in such position, thereby avoiding cutting the elongated bodies into variegated shaped particles.

In producing a material having a diameter of 5/64 inch, I make the grooves on the rollers 104 and 106 with 3/64 inch depth and space the rollers 1/64 inch apart, thus providing 2/64 inch, or 40% of the diameter of each body subject to breaking action by the ridges on the roll 104. The ridges on the roll 104 are spaced so as to cut the elongated bodies into particles substantially 1½ diameters in length.

After passing the rollers 104 and 106, the materials are returned as indicated to the upper end of the combined breaking and screening apparatus 8 for screening treatment as already described.

I will now describe in particularity the manner in which the various steps of my improved process are carried out and the variations and modifications with which an improved product such as is set forth herein may be produced.

Step I

Describing first Step I, I proceed with some variation in the cases of the initial raw materials hereinabove used for illustration in aforementioned Cases A and B respectively. In Case A materials, the salts of potash and the salts of nitrogen and/or of ammonia and phosphoric acid are assumed to have been previously obtained in combined solid form. In Case B materials, the salts of potash are assumed to have been previously obtained in solid form, but the combination of the ammonia and phosphoric acid is effected concurrently in the first step of the process thereby providing economies in the production through elimination of the usual solution evaporation, crystallization, dewatering, drying, and other steps in making the salts of ammonia and phosphoric acid.

In carrying out alternative 1 of Step I, aforementioned of my process, I first effect the grinding of all the salts, in quantity according to predetermined weights and proportions of constituents required for the mixture desired. These salts may be finely ground in equipment other than that hereinbefore described in my invention. However, the fineness and range of sizes is an important factor in the ultimate results of quality, yields and production of the product of this invention and all fine grinding machines do not produce the range desired. Furthermore, the fine grinding of salts in standard mills of the ball, tube, attrition, or roller type, with or without supplemental, closed or separate circuit sizing by screens or air separation requires either perfectly dry or free flowing wetness of the feed. Salts as the product of the source of natural deposit or of crystallization as will be generally received at the conversion or treating plant are normally wet or caked.

As herein described, there is required as the product of Step I, a moisture content consistent with a paste of the finely ground salts. About 5% to 10% total free water content is usually the correct amount for this required consistency although the actual water content will vary with various salts and like materials. Therefore, grinding of the salts in the combination apparatus hereinbefore described, has considerable economic advantage over that of the previous dry grinding in other apparatus in that it saves the preliminary drying cost thereto, and it is obvious that wet grinding (in the degree of wetness usually understood by the term) is impracticable for this purpose. The wet grinding producing a free flowing liquid would require the subsequent dewatering of this product which with soluble salts would obviously defeat the object desired, since such will reagglomerate the salts so ground. From this it can plainly be seen that operating and economic advantages exist in grinding in the combination apparatus in which the subsequent operations of the first step is to be conducted. These advantages will be further on shown to be of especial moment in the cases of certain water content of the phosphoric acid and of aqua ammonia. In certain cases I have used as a part or whole of the raw materials for this process, salts of ammonium phosphates as taken directly from the crystallizer, and charged them into the above described apparatus with subsequent grinding in the pasty physical state, thus saving the cost of centrifuging and drying of the salts as would be necessary for handling or storage in their regular production.

I therefore preferably charge the desired salts as received in the said revolving pan 9, described heretofore in the drawings, with the muller rollers 15 in running position, and continue grinding until the said salts are all sufficiently fine for producing the paste of consistency desired. This required degree of fineness may be determined by feeling the salts with the hand. When there is no gritty character noted in rubbing between the fingers, the required fineness is reached. It may be determined more definitely when the salts are substantially dry (that is containing less than 2 percent of free water) by a screen test so that less than 5 percent remains on a 120 mesh screen and all passes an 80 mesh screen. In practice where a series of batches of equal size of the same materials are being treated, a definite grinding time is taken as sufficient for attaining the necessary fineness without actually testing the product of such grinding.

After the salts are ground sufficiently fine, water is added to them in the mill, still running and with rollers down in operating position. This water added for the purpose of producing the desired consistency of paste is preferably sprayed onto the material in the running mill. The quantity required is determined in an initially produced batch by adding gradually and trying by feeling with the hands until the desired consistency is reached. With practice on the series of the same character of batches a definite weight or volume of water is added. After the addition of the water the kneading operation is continued until the desired consistency is reached.

This stage is determined in initially tried batches by a feeling about the same smoothness of flour dough. However, practice provides the result required by a definite kneading time. In practicing this invention according to Alternative 1 of Step I, hereinbefore specified, the product can now be removed from the mill for proceeding with Step II. The kneading action in principle consists in alternate application and release of pressure repeated in rapid frequency several hundred times.

The kneading action when carried out as described causes a rise in temperature from friction on surfaces of the coarser particles, which rise in temperature increases the solution of said coarser particles, and the alternate release of pressure giving an instantaneous period of cooling the said formed supersaturated solutions causes reprecipitation of salts in minute form. This continued and repeated action ultimately reduces the entire mass to one of uniform crystal size and uniform solution content thereabout the surface of said minute crystals of all the salts in equilibrium.

In carrying out the practice of this invention according to Alternative 2 of Step I, hereinbefore set forth, the grinding of the salts used as such as raw materials in the process are treated in the same manner as hereinbefore described in Alternative 1 of Step I.

All the substeps of Alternative 2 of Step I, including the addition of the salts to the mill, the fine grinding, the chemical combination of the ammonia and phosphoric acid, the water addition for activating the ammonia reaction, that for providing the necessary consistency, the kneading of the mixture to necessary consistency, the intermediate taking of samples of the materials under process for ascertaining the stage of fineness, ammoniation or of consistency, and the final removal of the completed Step I product from the mill may be carried out with the hood tightly closed. This feature of this invention has the obvious advantages of keeping at an irreducible minimum the loss and nuisance of dust and ammonia escapes, as well as assuring against contamination of the product from extraneous sources, as well as the economic advantage of labor and material saving through avoidance of transfer of materials or equipment.

After the fine grinding of the potash or other salts, preferably in the combination apparatus hereinbefore described, the phosphoric acid and ammonia are added simultaneously and gradually in total quantity required for the desired resulting chemical analysis of the product. The phosphoric acid may be added from a well known blow case, measurement being by volumetric or gravimetric means.

The phosphoric acid may be weighed or measured first and poured through a funnel and pipe or other means into the pan. I have found it advantageous to introduce the acid so that it will be delivered uniformly as to time and quantity on the moving layer of the previously added and finely ground salts. When the acid is added in too large quantities at a time there results a localized lumping of the salts onto which it falls, thus delaying the complete and uniform neutralization of the ammonia and acid.

It is preferable to spray the acid in as fine a mist as possible. However, this presents certain difficulties in any type of standard pressure sprays due to the high viscosity of the concentrated acid and to difficulty in obtaining properly resistant materials of construction. It is obviously impracticable in this operation to spray with air, steam or other gases as a medium, since it is desirable to maintain as saturated an ammonia atmosphere in the hood as possible.

The ammonia may be derived from either aqua ammonia or liquid anhydrous ammonia. In case aqua ammonia is used, it is necessary to provide some distillation means so as to pass the gases into the combination reaction apparatus with a minimum of water vapor. Where liquid anhydrous ammonia is used, it may be converted to vapor outside the reaction apparatus and passed therein in gaseous form. I prefer bringing the anhydrous ammonia into the apparatus and even directing it onto the moving mass of solids being treated, since I can thereby utilize the cooling effect of the vaporization of the liquid ammonia to balance the heat of combination of the ammonia and phosphoric acid.

I even further prefer bringing in the ammonia and phosphoric acid so that while they are leaving the then respective introduction conduits, enroute to the surfaces of aforesaid salts they may be brought into maximum intimacy of contact, thus further accelerating the speed of neutralization. This may be accomplished by juxtaposing the exits of their respective conduits, which may both be in the forms of sprays. The ammonia in this way vaporizes to a large degree so that its rising vapors must pass into intimate contact with a mist of acid.

I have further found that the velocity of the reaction of the introduced ammonia and phosphoric acid is greatly increased by the introduction of water preferably in mist or vapor state.

I have further found that the velocity of the reaction is maintained at a much higher rate where the salts are maintained in a comparatively dry, loose, state so as to present the maximum area of reacting surfaces than is the case where moistening during the neutralization stage is carried to the point of causing the said salts to cohere and ball. For this reason I add only sufficient water during the neutralization stage to perform the activation function. This I have found may be as low as 2 per cent of the weight of the ammonia provided it is added continuously and in such a manner as to contact with the ammonia vapor.

In the foregoing described introduction of ammonia in such relation to the coacting entering phosphoric acid, it is not possible to so cause all the ammonia to combine as it enters. This is due to the fact that the vaporizing ammonia has so much greater relative velocity and volume than that of the projected liquid acid, that the contact cannot be of sufficient duration to complete the reaction, even if they are being introduced in exact reacting proportions. The portion of the ammonia which does combine with phosphoric acid during the contacting period, of course, needs no activation. That portion of the ammonia which escapes through the mist of acid and which passes as a gas about the mass of solids does require this activation.

I have found that the activation water is best added so as to most completely fill the space above or about the solids under treatment. I therefore prefer introducing the water for activation in the form of wet steam from a small vaporizer into which a predetermined quantity of water has been placed and to vaporize the entire quantity continuously into the reacting apparatus during the neutralization period. I have practiced adding this activating water as a liquid both as a spray and in minute stream or drops, which is effective but the vaporizing method gives best results as regards acceleration of reaction velocity of the ammonia and phosphoric acid.

In carrying out the process, after the grinding of the salts by means of the action of the muller rollers I raise the said rollers and continue revolving the pan 9 with continuous addition of acid and ammonia through their respective conduits, also introducing vaporized activating water.

The ammonia may be introduced at such rate as to preserve substantially atmospheric pressure within the apparatus, and so obtain a practical time of neutralization. However, I prefer maintaining a pressure even up to and above 100 pounds per square inch, within the apparatus to perform the neutralization within a few minutes. Ordinarily the high pressure is only carried for a portion of the time, since the combination with the phosphoric acid absorbs the gaseous ammonia to the solid ammonium phosphate and concurrently reduces the pressure down to about atmospheric. Naturally, the high rate of reaction with the initial high pressure of the ammonia gas, concurrently causes a rapid rise in temperature, which it is necessary to reduce by accelerated cooling means in order that the reaction proceed to the compounds having a high ratio of $NH_3$ to $P_2O_5$.

It is well known that monoammonium phosphate has a decomposition temperature of around 155° C., and diammonium phosphate of about 70° C. under normal vapor pressure conditions. In order to remove the heat of reaction and consequent temperature rise occurring in the mass of solids, it is necessary to increase the heat absorption rate from the pan by increased flow of cooling water, and to maintain a greater thermal head for the outward flow of heat. The increased reaction through consequent increased temperature of the gases within the mixer will further increase the pressure at a rate in addition to that developed by the increased weight of ammonia brought into the hood space.

The control of the degree of ammoniation of the specific mixtures in this process is attainable in this general process in three ways. Obviously in the instance of a nitrogen, phosphorus, potassium fertilizer ratio, the phosphorus and potassium proportion and quantity is subject to exact weight or volume addition control, where the nitrogen addition is in the form of nitrate salts, urea, ammonium sulphate, or other solid form for addition, that component is also subject to weight or volume control. When the nitrogen component is added in the form of ammonia the exact control of the addition requires more accurate and dependable means of assuring the amount in combination, due to possible source of loss or incomplete combination of the gaseous ammonia brought into the hood space about the solids. Hence, the three possible ways of control of ammonia addition I have developed are:

*Method A.*—Weighting or measuring the ammonia before or during introduction into the reacting chamber.

*Method B.*—Sampling the solids under process and determining the Ph value thereof against a standard of the same proportion of salts other than the ammonium phosphates involved.

*Method C.*—Control of temperature in the reacting chamber to that of the predetermined equilibrium of the desired ammonium phosphate compounds under the vapor pressure conditions prevailing in the said chamber.

In Method A the anhydrous ammonia is weighed from cylinders as delivered into the aforedescribed apparatus. This may be vaporized outside the apparatus and delivered thereinto in gaseous form, or it may be delivered into the said apparatus in liquid form as aforedescribed. Where aqua ammonia is used, the solution may be first added in weighed or measured quantity into an ammonia still extraneous to the said apparatus, and distilled in such a manner and rate that the total separated water vapor saturated ammonia gas passes into the hood space of the said apparatus.

In Method B the ammonia as aqua ammonia or as anhydrous ammonia is delivered directly into the apparatus as aforedescribed and the samples of the solids taken from the moving mass under treatment therein by means of a tube passed through sample opening in the said hood. The sample so taken is immediately analyzed according to the method which follows:—About 1 to 3 grams are dissolved in about 100 cc. of water, and about 10 cc. of the solution transferred to a comparator tube of the standard Ph determination apparatus. A few drops of bromthymol blue or other suitable indicator are added and comparison is made in the color comparator with standard colored solutions of known Ph value. The Ph value of the sample so taken can be determined in about three minutes. The masking effect of the potash salts upon the color intensity of the corresponding pure salt of ammonia and phosphoric acid compound is previously determined against the standard color tests of the range of Ph in which the current ammoniation range is being determined.

In regular practice I develop a table showing the degree of ammoniation in the particular ratio being treated for each Ph value within the range. With this table the Ph value shown by test of the same is immediately read off the scale in terms of ammonia still to be added to obtain the desired product.

While this Method B may be used for and considered only as a check on the other methods of control of ammonia addition, I have found it can be entirely relied upon as a guide for the ammoniation without regard to quantitive addition from the source. For instance, in producing a mixture containing ammonium phosphate in the ratio of 23.3 parts of mono ammonium phosphate to 76.6 parts of di ammonium phosphate, and potassium nitrate in proportion to the combined ammonium phosphates of .6 of the former to 1 of the latter, the desired proportion of ammonia is reached when the Ph reading shows 7.2.

Usually the phosphoric acid is added currently and simultaneously with the ammonia. However, when all the phosphoric acid required for the desired ratio has been added, there may be a certain amount of ammonia still in the hood space about the solids not combined or there may, through losses or other sources of error be insufficient ammonia combined for the desired ammonium phosphate combination. This Method B of determining quickly the actual amount of ammonia in combination is therefore of great value in making this process economically workable.

In case of use of control Method C, hereinbefore outlined, I control the temperature of the salts under process within the apparatus, by maintaining a constant temperature within the apparatus. With this method of control it is necessary to predetermine the critical temperature required for each mixture and for each condition of operation. For instance with a desired salt according to the above process of ammonium phosphates in ratio of 23.3 parts of mono ammonium phosphate to 76.6 parts of di-ammonium phosphate, and in mixture with potassium nitrate in ratio of .6 parts of the latter to 1.0 part of the former, and with a mixture of ammonia gas air and water vapor in the hood space at substantially atmospheric pressure, this critical temperature is between 80° C. and 85° C.

With a temperature of from 80° C. to 85° C. maintained for the salts in process of formation and in intimate agitation with the aforesaid gases, the ammonia will combine with the phosphoric acid present up to the aforementioned ratio of 23.3% mono ammonium phosphate to 76.6% di-ammonium phosphate and no further, regardless of the excess of ammonia over and above that required for the said quantitative combination, or the excess of time of contact of the said gases over that necessary for the combination to take place to the said degree.

On the other hand, if the ammonia gas be placed and maintained under higher pressure than atmospheric, the temperature at which the given combination of ammonia and phosphoric acid will occur will be increasingly higher with the said pressure. Furthermore, the increased concentration of ammonia gas in the space about the said salts under process of formation will further increase the temperature at which the given combination of ammonia and phosphoric acid will occur.

It is obvious to anyone skilled in the art, that this temperature control of the salts in process must be regulated throughout the period of the formation of any given batch of materials being treated. The heat of neutralization of the ammonia and phosphoric acid will naturally cause a rise in temperature as the combination of the two components progresses.

Furthermore, the early stages of combination of ammonia with the phosphoric acid will proceed more rapidly than that of the later stages. Also the lower temperature, as is well known, is more conducive to increased velocity of the reaction and hence is of economical interest in shortening the time required for completion of any given batch of product.

It is preferable, therefore, to hold the temperature down at the beginning of a batch when the ammonia and phosphoric acid are just being added and allow it to rise to the critical point abovedescribed, when all of the required phosphoric acid has been added. My preferred means of regulating this gradient temperature lies in the employment of well known thermostatic control devices, by which the rate of flow of the cooling medium through the temperature control sections of the aforedescribed apparatus is caused to decrease from the start of the batch to the finish of the phosphoric acid addition, whereupon it is held at constant temperature control corresponding to the predetermined critical temperature aforedescribed, being governed by the factors of ammonia concentration and pressure in the atmosphere in juxtaposition with the solid salts involved.

Method C of control of degree of ammoniation is particularly advantageous where the source of the ammonia is in aqua state and where distillation from an extraneous apparatus for current addition to the mixer is employed. It is well known that such distillation separation of ammonia from its aqueous combination is most economically performed continuously. In the synchronizing of a continuous factor and intermittent step of a given process, both should be subject to independent control. When I use aqua ammonia in extraneous distillation as a source of ammonia in this process, I cause the gaseous ammonia issuing from the said extraneous still to either pass continuously through the apparatus, about the said solid salts under process of treatment in closed circuit back to the still head, or I maintain the ammonia vapor under pressure within the said hood space by means of proper pump facilities taking its suction from the still head. In either case there are no means for quantitatively delivering a predetermined amount of ammonia into the apparatus for required addition for each batch. It is, therefore, essential in such case and practice to control the ammonia combination in the specific batch by the control of temperature within the apparatus.

A further variation in the details of procedure of this step in this process presents economic advantage under certain conditions, especially where the phosphoric acid available for use is of such dilution or where wet salts only are available that considerably more water is contained therein than is necessary for producing the proper plasticity of the hereinbefore described paste, in which the said phosphoric acid is proportionately used. In this variation, it is necessary to condense the excess water brought in with the salts or with the dilute phosphoric acid, as the water is vaporized by the heat of the reaction, and remove it from the apparatus, many means for doing which will suggest themselves to those skilled in the art. As the reaction proceeds, a sufficient part of the water thus condensed may be returned gradiently to the mixture to form a paste.

After the desired combination of ammonia and phosphoric acid is reached in this step with the immediately aforedescribed variation, the ammonia pressure is reduced and with no further chemical combination occurring the salts are cooled and the water content of the said salts adjusted with kneading to produce the desired plasticity of the paste therefrom for subsequent steps.

In order that the resulting product of Step I treatment be most efficiently and economically treated in Step II, hereinafter described, there must be no hard or segregated portions of the total material in the final mixture.

After the fine grinding of all the solid salts and the combination of the ammonia and phosphoric acid, according to any of the variations, modifications and control methods hereinbefore described the working or the kneading of the resulting materials with proper water content control is of great importance for subsequent steps of the process covered in this invention. The controllable effective weight of the muller rollers according to means available through apparatus shown and described is of great value in obtaining a finally accurate homogeneous mixture. The excessively heavy muller rollers cause formation of segregated hard lump in the mass and thus defeat the object sought.

The minimum weight that will cause a working of this mass is most effective. The kneading of the class of soluble salts forming fertilizer materials is of different effect and requires decidedly different treatment in detail from that of purely plastic materials, such as macaroni paste, putty, etc. In the latter alternating heavy pressure application and release on a large mass accelerates the plasticity thereof, while in the case of soluble salts such as are the subject of treatment in this invention, heavy pressure upon thick masses tends to force out the accompanying solution, thus rendering the mass treated heterogeneous rather than homogeneous.

The exact relations of applied alternate pressure and thickness of mass is hardly subject to numerical evaluation. Its requirements for best results are variable hence the design of quickly and easily adjustable weight of kneading apparatus described herein. The maximum thickness of the salt paste mass upon which pressure of alternating cycling should be applied is about 3 inches and the maximum weight of rollers in such kneading action for best results is about 300 pounds.

I propose utilizing this invention in supplying the needed steps in savings on ammonia fixation in by-product coke oven and gas works. In the present state of the art the continuous saturation by which the ammonia is removed from the gases by combination with sulphuric acid as ammonium sulphate is the most economical unit for its purpose. The substitution of phosphoric acid for the sulphuric acid thus producing ammonium phosphate presents considerable difficulties in that the crystals so formed are of a slimy nature almost impossible to dewater and to handle by usual methods employed. Furthermore, the control of ammoniation of the phosphoric acid by such means is difficult due to the several salts of the two components being made simultaneously in various zones of the saturation. The production of a marketable salt of ammonia and phosphoric acid directly from the gas carried ammonia presents numerous difficulties such that, so far as I am aware, no adoption of such practice has been made to date.

I therefore propose to operate the usual forms of bubbling continuous saturator with the gas carrying the ammonia brought into contact with phosphoric acid in similar manner to that now practiced with sulphuric acid. The ammonium phosphate crystals formed in the saturator will then be removed by siphon or other suitable means, in a semiliquid state, and the mother liquor partially removed by centrifuge and drainage or other conventional means. The wet mass is then weighed or measured, so as to deliver the predetermined desired quantity of ammonia and phosphoric acid in combination into the grinding, mixing and kneading apparatus, with or without the potash salts needed for complete fertilizer mixture. The ratio and quantity of phosphoric acid and ammonia may be adjusted in the aforedescribed apparatus by addition of either constituent and proceeding as hereinbefore described in the several variations of the process as required.

The crystalline ammonium phosphates obtained as just described are ground to the required fineness, along with potash salts and other introduced solids where necessary, the water content is adjusted to that required and the kneading action is carried out until paste of the finished consistency required for the subsequent steps of this invention is obtained. It is obvious that this process modification provides a means of converting by-product ammonia directly into highly usable concentrated fertilizer materials with minimum of expensive materials and operating steps.

A further alternative detail in the foregoing described process, which I propose, consists in adding to the mixture of solid salts within the grinding, mixing and kneading apparatus, anhydrous ammonia containing in solution such salts as ammonium nitrate, urea, or other materials soluble in anhydrous ammonia which may be desired as a constituent of the desired fertilizer or chemical product. Substantially no change in the principal apparatus from that hereindescribed or its functional equivalent will be required for carrying out this proposed alternative detail along with all the other described current and subsequent steps of this process.

The said anhydrous ammonia upon being brought in liquid form into the said solid salts in said pan 9 or equivalent, will quickly have its dissolved accompanying salts precipitated in infinitely finely divided form. This said precipitated salt will, under the hereinbefore described treatment, become intimately mixed with the solid liquid or pasty materials within the said pan, while the thus released liquid anhydrous ammonia will thereupon immediately proceed into combination action as hereinbefore described. The advantages of this described detail of this process lies in utilization of a form of the ammonia and salts soluble therein under such conditions as provide economies in the production or transportation of such constituents.

It will further provide conditions for accelerating the speed in completing batches of mixtures in which said materials may be used by instantly introducing the salts which are soluble in anhydrous liquid ammonia, in an infinitely finely divided form, even finer than is possible to obtain by grinding in any practical mills, thereby effecting economies in operating time and also contributing to improved quality of ultimate product in increased density and infinite homogeneity of any desired mixture of salts, or ratio of constituents throughout every minute particle of any mass thereof.

In all the hereinbefore described modifications and variations of this process, I have referred to the addition in solid state of potash salts and of other materials as component raw materials of the final product of this process. The primary addition of the said solid materials is necessary for carrying out this process only where constituents of the final product are available only in solid form or are so utilized in interest of economy.

It is obvious that where the product desired consists of chemical constituents, whose source is in liquid or gaseous state, the various described steps apply thereto equally effectively as where a solid material is added as a starting point. For instance any salts or compounds of ammonia and phosphoric acid may be produced, in the form and by methods described in this invention using gaseous or liquid states thereof respectively. Likewise salts of bases and acids that are in gaseous or liquid state or both in their respective forms may be subjected to treatment according to the steps involved in the hereindescribed process with equivalent resulting product.

The production of monoammonium phosphate, diammonium phosphate, and intermediate salts thereof, has heretofore been performed entirely through thoroughly fluid solutions during the neutralization stage. After the said neutralization or combination of ammonia and phosphoric acid the more or less complex process steps of evaporation or crystallization or both are essential to produce the desired ratio of said salts in solid form. Where concentrated phosphoric acid containing over 70% $H_3PO_4$ is used as a starting point in producing ammonium phosphates, and the ammonia is introduced into the neutralization step in gaseous form, it is necessary to maintain the solution fluid by means of circulating mother liquor from a previously neutralized and crystallized same compound or by other dilution means.

Such a process is discussed in detail in the previous U. S. Patent No. 1,822,040, issued to Bethune G. Klugh and Warren R. Seyfried, on September 8, 1931. The hereindescribed process provides means for utilizing phosphoric acid of any concentration with gaseous ammonia in the production of ammonium phosphates of any desired ratio of $NH_3$ and $P_2O_5$ content, directly from the two said component raw materials, without any solution steps whatever.

It is well known to all experienced in the production of ammonium phosphates, by the hitherto only available solution methods, that definite control of the production of any ratios other than mono ammonium phosphate or diammonium phosphate, to any degree of uniformity is difficult, if not impossible. This is due to the well known chemical laws that only specific salts are crystallized out of saturated solutions for any given set of conditions.

For instance if it is desired to obtain a salt equivalent to 62% monoammonium phosphate $(NH_4)H_2PO_4$ and 38% diammonium phosphate $(NH_4)_2HPO_4$, a substantially saturated solution with such equivalent content ratio of said salts can easily be made, but when the crystallization of the salts from such solution, is attempted it is always found that different salts will come out at various temperatures and concentrations, so that any mass of the total crystallization with such solution contains a mixture of separate crystals of mono and of di-ammonium phosphate with possibly some crystals of double or twin crystals of intermediate salts. However the said crystallization is effected there can be no ultimately homogeneous mass of salts obtained by the solution method. The aforedescribed feature of segregation of loosely juxtaposed crystals of salts, applies fully as definitely to mono and diammonium salts respectvely as to any other salts.

From the immediately foregoing discussion of facts in this connection it is seen that the hereindescribed process provides a positive means of direct production of an ultimately homogeneous mixture to infinite proportions of any ratio of $P_2O_5$ and $NH_3$, directly.

Step II

In carrying out the second, or extrusion step, of my improved process it is necessary to show the principle involved in order to differentiate it from a similar operation in other arts. The extrusion of materials by means of pressure through apertures of various sizes and shapes is an old art. However, in substantially every case within the knowledge and survey of the applicant, the only materials that have been extruded successfully are those having a definite degree of plasticity at certain range of temperatures, and with a wide range of pressures.

For instance, with macaroni, rubber and metals, in each case the plasticity, is developed through working or heating or both, and thereafter the degree of plasticity of the materials has litttle change within a range of pressures of a few pounds to thosuands of pounds per square inch. The principle employed is most generally one of placing a very high pressure upon a large mass of the material against the apertures through which the extrusion is to be effected.

On the other hand, with salt mixture pastes which derive their plasticity or softness from their saturated solutions intimately mixed throughout the given mass, there is a critical pressure upon any appreciable mass which causes the softening solution to be squeezed out and segregated leaving a hard mass of moist salts that will not be movable nor that will flow at any pressure.

For instance, a mixture of any of the hereinbefore mentioned salts prepared according to any methods hereinbefore described, that is by fine grinding, addition of 5% to 10% of water and kneading when placed upon a perforated plate in a mass ½ inch in thickness or more and subjected to pressures up to 20,000 pounds per square inch will effect no extruding whatever through the said perforations, but will become compact into a block of rock like hardness. In such case the solution is driven out and separates from the remaining salt in the mass in which it was intimately mixed.

Having discovered this differentiating property of salt pastes from that of plastic material pastes it was necessary to determine the conditions under which its extrusion might be effected. It was noted that by a wiping effect, whereupon a very small quantity is brought under pressure immediately in contact with the surface of the perforated plate the extrusion may be effected. However, the material in paste form must necessarily be in a compact mass with substantially no voids in order that it be extruded into compact sections subject to becoming hard and strong upon subsequent drying.

This I have found requires compressing the salt paste in motion to a firm mass and bringing full pressure upon it, simultaneously with its being projected against the perforated surface. With the screw type of extruder I have found that successful extrusion of salt pastes obtain only when there is a minimum of space between the terminus of the compressing screw and the plate through the apertures of which the salt paste under action is to be extruded.

It appears from observations and deductions involved in developing this invention, that the fundamental principle of extruding a salt paste lies in first bringing all particles into such compactness that all gaseous matter is excluded, and second in increasing the pressure of the resulting gas-free mass to sufficient magnitude for forcing it through extrusion apertures, but with the latter action in constant motion of said mass and in contact with said apertures. The distinction therefore, over generally practiced extrusion processes is that the mixture of salts must be extruded under the influence of dynamic pressure as distinguished from static pressure.

When these conditions are observed in carrying out this invention I find that the resulting extrudes are of uniform density with smooth surfaces. They pass out of the apertures quite soft immediately thereafter, and as the pressure is released they are coated with a film of the saturated solution of the salts contained therein. If they are allowed in this state to come in contact one with the other they cohere tightly so that subsequent separation after drying is not possible without destroying the uniform cross section of them.

It is therefore necessary to remove the moisture from the film covering the individual particles and at the same time to cool them substantially to atmospheric temperature, the latter effecting a hardening that permits subsequent handling without destroying the ultimate sectional form desired. I do this by means of the light current of cold air passing over the extrudes, as they emerge from the machine, which causes vaporization of the film of water on the surface, simultaneously cooling and hardening as required.

I prefer the vertical form of extrusion machine since the extrudes are projected downwardly and by gravity remain, immediately after extrusion, in vertical and individual position out of contact, one with the other, until the cooling and surface hydration is effected in sufficient degree to permit the handling above described, and also subsequent treatment necessary.

It is obvious that the aforedescribed extrusion process, consisting of compression of a salt paste to a compact mass within pressures not exceeding that at which the paste sustaining solution is separated from the salts and simultaneously with bringing the said mass under said degree of compactness in extrusion relation with a perforated surface, continuing increase of pressure to that at which the said mass is forced through the said apertures may be carried out in other forms of apparatus than that described herein. The gradiently controlled primary compressing of the salt paste mass, so as to produce a maximum density, yet maintaining the said mass in mobile state, and the final compression in relation to cause the mass to flow through apertures with sufficient resistance to form uniform smooth surfaced dense cylindrical elongated shapes may be done with relative functional members in longitudinal cylindrical or planetary development.

In this inventon the particular purpose desired in the aforedescribed extrusion process step, is that of the principle stage in producing uniformly sized particles with surfaces resistant to hygroscopicity. These functions relate largely to the desired ideal characteristics in a fertilizer.

The aforedescribed process produces the required density in the reagglomerated salts at the same time the smooth surfaces required for utmost practical resistance to hygroscopicity, when the hereinafter described subsequent steps are performed. An ideal size of the said extruded agglomerate appears to be about two millimeters diameter, which is one of the preferable specifications of size of the aforedescribed extrusion apertures.

The extruded elongated shapes made according to the step hereinbefore described, are somewhat relatively soft and are saturated with solutions of their respective component salts throughout the full section of each particle. The said extruded sections have usually a temperature of about 70° C. throughout, immediately after extrusion due to frictional pressure of said extrusion. The cooling of the said particles thereupon results in a slight but dynamic contraction in volume, due to decreasing volume of the solution therein, and to recrystallizing of the salts from the said intermixed solutions. The minute crystals so formed fill the microscopic voids hitherto occupied by solutions, with the result that the residual mother liquor from the said solutions are forced to the surface.

All of the said mother liquor is thus forced to the surface of the said particles, and the initial cooling after extrusion prevents the extruded shapes thereafter from cohering into firmly and inseparably united aggregates. I have found that it is necessary to cool the extruded shapes completely to atmospheric temperature, immediately after extrusion with all particles substantially separated from surface contact in order that they may be then superimposed in storage and be subject to mass handling and maintain their individual form. The hereinafter described subsequent steps disclose means of drying the hereinbefore described extruded shapes maintaining their density and strength and dividing the aforedescribed elongated extruded shapes into lengths productive of uniform drillable particle size.

Step III

The elongated extruded sections of the second step of this invention have smooth surfaces as produced by the soluble salts upon their said surfaces aforedescribed, leaving a deposit of minute crystals, which unless removed leaves a microscopic irregularity of surface area which accelerates accumulated retention of water deposited from atmospheric vapor thereby further accelerating solution of said minute salt crystals and thus providing conditions for coherence and caking of the aggregates of such resulting extruded sections. The said elongated regular sections of the said second step, contain water in closely bound occlusion throughout each section.

It is the function of the third step of my improved process to remove the aforedescribed minute surface crystalline irregularities and also the water contained therein without disintegration of the said forms. This I have found may be done by means of passing air of relative low humidity in contact with the said elongated shapes while conveying them in individual and aggregate movement. When the said elongated regular sections of salts or chemical compounds or mixtures of fertilizer materials contain a component of salts decomposing at a temperature lower than 100° C., the drying operation must be conducted so that the said material does not exceed its decomposition temperature.

For instance, where diammonium phosphate is contained in the said elongated shapes their temperature must not exceed 70° C. during this operation. The conventional revolving cylinder dryer, through which this said material is conveyed in tumbling agitation contacting with relatively low humidity air passed therethrough either countercurrently or concurrently will perform both the drying and surface cleaning and polishing function satisfactorily. The drying must be performed slowly, however, in order that the dense coherence of the particle be preserved. This retardation of drying is effected automatically where the temperature is maintained under 100° C. since under such conditions the removal of the occluded water is essentially slow.

The test of the removal of water down to under .75 per cent is easily made in that the particles under such condition are relatively hard at a temperature of 60° to 80° C., while with a water content above .75 to 1.00 per cent they are relatively soft at this temperature.

With the said extruded salt paste found being by nature of production of comparatively uniform water content throughout the complete volume of each section thereof immediately after production, it is obvious that the removal of this said water therefrom requires much longer drying time than in case of crystals or individual solid particles in which the moisture exists only on the surface thereof.

I have discovered that when the aforedescribed sections are heated to about 70° C. for a sufficient period in motion to show a comparatively drier surface than interior, and then cooled down to about 25° C. a portion of the occluded water of the interior is projected to the surface. The projection of a portion of the contained water to the surface thus provides conditions for its vaporization by further contact with air of relatively lower humidity, said lowered humidity being effected by heating of atmospheric air.

Treating the extruded sections alternately with heated and cold air has a decided effect upon the physical properties of the sections. As the sections are heated there is an increase of salts in solution within each section, which solutions migrate to the surface of the section and a part of the water is evaporated. Following the heated air treatment with cold air brings about a crystallization of the migrated salts in solution, this crystallization taking place in the microscopic interstices of the outer shell of the sections. Repeating this alternating treatment removes substantially all of the hygroscopic water and renders each section extremely dense on its exterior surface and microporous in its interior.

The product thus produced is substantially non-hygroscopic and will remain in storage for an indefinite period of time without caking.

Step IV

After the materials under treatment have been subjected to the aforedescribed steps, the extruded particles are in solid firm state, resistant to handling and to relatively humid atmosphere, but are largely in lengths of three times their diameters upward to ten diameters. In order to bring these said shapes into drillable and uniform sizes, it is desirable to separate the said forms into sections retaining the uniform circular or polygonal cross section, with smooth continuous surfaces, in lengths from one to one and one half diameters. Such size and shape then produces a maximum degree of free flowing character, suitable for drilling with ordinary farm machinery. It is essential for economic operation of the process described in this invention, that a minimum quantity of the said elongated extruded shapes be reduced to fines or to split sections.

In the fourth step of my invention I perform the sizing desired effectively and efficiently as will now be described.

The fourth or sizing step in the process of my invention consists of two interacting or separate operations which I denominate breaking and screening. The relation of these two substeps are in the same order as that of the well known and long practiced operations in many industries known technically as closed circuit crushing and screening. The elongated extruded shapes are all substantially exactly of the same diameter and in varying length. They are of very uniform compression resistant strength throughout their individual sections and have no distinctive planes of relative weakness throughout. Hence any crushing action, such as rolls or hammer mill type, tends to break the said cylindrical sections into heterogeneous shapes responsive to the haphazard directional compressive or impact action that is thereby exerted upon them.

Such types of breakers provide for no control of the directional breaking force relative to the desired planes of rupture upon the individual pieces. For instance, with a preferred size of production of the said elongated extruded and dried sections of 5/64 inch diameter, if any aggregate quantity is fed into any conventional types of crushing or breaking apparatus, no controlled position of the elongated rod-like particles will be subjective to the crushing or breaking members thereof, and the said rod-like particles will be subject to breaking in any or all indefinite direction such as longitudinal splitting, breaking at acute angles and along irregular contours relative to the longitudinal axis of said particles, and into all possible irregular shapes and sizes.

The breaking required and accomplished in the case of this invention is in planes at right angles to the longitudinal axis thereof and in controlled lengths. I do this by controlling the application of the directional pressure, magnitude of rupturing force, and depth of cut upon the said elongated extruded sections. I further control the feed or delivery of the mass of such said sections in such a manner that the said controlled breaking components are exerted upon individual sections of the said extruded rod-like material, at the same time avoiding any exertion of the breaking forces upon any superimposed aggregate of the said sections, or the transmission of any breaking pressure through any one or more particles to other particles.

In this process of breaking along desired planes of the said cylindrical sections and maintaining the cylindrical form in the so broken lengths, I cause the rupturing forces to be directed at exactly the location necessary upon each individual said section for separating the said elongated section along its cross sectional plane at evenly spaced predetermined intervals, and to release the said rupturing force instantaneously with the said resulting rupture and separation. Each individual elongated section remains free in compression relation to other accompanying particles during the active breaking operation thereon in this process.

Furthermore, in the separation of the desired sizes from the aggregate of the particles as received from the aforedescribed steps and broken as desired in accordance with the immediate hereinbefore description, conventional methods and apparatus of screening fail to make the accurate and complete separation of a definite range of short lengths from that of the longer lengths of the uniform diameter sections. It is necessary to cause the aggregate feed of varying lengths of said particles to pass over a screen surface with apertures of the maximum size of the range of particle size desired to separate, in such a manner that the longer length thereof desired to separate, shall remain in a position parallel with the screen surface plane.

If the said varying lengths of the said particles are subject to such agitation as substantially all conventional screens produce, the longer lengths will be projected repeatedly into vertical relation to the said screen apertures so as to pass them therethrough along with the shorter lengths desired, which correspond to the aperture dimensions in the screen selected. I have found that the said cylindrical elongated extruded sections are moved in the said position parallel to and over the screen surface when such surface is at such inclination that it is just insufficient for gravitational flow thereupon, but when the said screen surface is vibrated with such controlled minute amplitude that the movement of said surface is just insufficient to project particles thereon at a greater elevation from said surface than that of the diameter of said particles.

I have found that any motion of the screen surface as a unit must be avoided in order to effect the selective separation aforedescribed. I have found it necessary to repeat the screening of the undersize product in order to remove all of the said particles that exceed in length the aperture dimensions of the said screen utilized. This repetition may be advantageously conducted in continuous process, each repeated screening tending to further approach to an irreducible minimum the said excessively long particles in the final product.

The accomplishment of this desired separation of sizes requires control of the said elongated sections in positional parallel movement relative to the screen surface, of amplitude of vibration of the said surface and of velocity of the travel of the said particles across the said surface.

I have found that the said particles must move across the said surface in substantially single layers, since any superimposing of the said elongated sections one upon the other naturally brings the uppermost ones into vertical disposal conducive to passing endwise through the apertures of the said screen, which have dimensions less than the length of the particles sought to separate.

I have further discovered that the length of travel of the said elongated extruded sections must be limited since under the even limited and controlled amplitude of vibration of the said screen some of the longer oversize particles gain velocity and collide with others causing a vertical projection thereof which allows them to pass endwise through the screen apertures. Naturally the mixture of sizes of the said elongated extruded sections must be fed onto the said separating screen in such manner that no vertical projection of the longer of said particles occurs in such feeding.

While I have described my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A process of producing homogeneous fertilizer salt mixtures which consists in grinding said mixtures to a state of finely divided powdered subdivision, adding thereto sufficient moisture to form a paste, kneading the paste to a dough-like consistency, forming the paste into compact particles, and drying the particles.

2. A process of producing homogeneous fertilizer salt mixtures which consists in reacting together ammonia and phosphoric acid in proportions such as to form a mixture of ammonium phosphate salts, grinding the salts to a state of finely divided subdivision as the reaction proceeds, providing moisture sufficient to form the mixture into a paste, kneading the paste to a dough-like consistency, forming the paste into compact particles, and drying the particles.

3. A process of producing homogeneous fertilizer salt mixtures which consists in reacting together ammonia and phosphoric acid in proportions such as to form a mixture of ammonium phosphate salts, controlling the reaction so as to form predetermined proportions of mono and di-ammonium phosphate in the mixture, grinding the salts to a state of finely divided powdered subdivision as the reaction proceeds, forming the paste into compact particles, and drying the particles.

4. A process of producing a concentrated fertilizer comprised of mixed potash, ammonia and phosphoric acid salts which consists in providing a potash salt in a solid state, reacting together ammonia and phosphoric acid in the presence of said potash salt, grinding the mixed salts thus produced as the reaction proceeds until they are in a finely divided pulverulent state, providing sufficient moisture for said mixture to form a paste, forming the paste into compact particles, and drying the particles.

5. A process of producing a concentrated drillable fertilizer comprised of mixed potash, ammonia and phosphoric acid salts, which consists in providing at least one of the salts in a solid state, reacting together the chemical constituents of the other salts in the presence of the initially solid salt, grinding the mixture of salts thus formed as the reaction proceeds, controlling the moisture of said mixture so that sufficient is present to form a paste, forming the paste into compact particles, and drying the particles.

6. A process of producing a homogeneous drillable fertilizer embodying mixed ammonium phosphate salts which consists in forming said mixture of salts and solutions thereof into a homogeneous paste of dough-like consistency, and subjecting said salts to pressure while in motion to extrude them and form drillable particles, the pressure to which the salts are subjected being limited to that at which they retain their solutions in homogeneous consistency.

7. A process of producing a concentrated drillable fertilizer comprising mixed plant nutrient salts, which consists in grinding and kneading the salts, incorporating thereinto a moisture content of from 5 to 10% to form a paste of dough-like consistency, extruding the paste to form dense elongated bodies, subjecting the extruded bodies alternately to currents of dry heated air and of cold air to remove both surface and occluded moisture, and breaking the bodies thus dried into substantially uniform drillable lengths.

8. A process of producing a concentrated drillable fertilizer comprising mixed plant nutrient salts, which consists in grinding and kneading the salts, incorporating thereinto a moisture content of from 5 to 10% to form a paste of dough-like consistency, extruding the paste to form dense elongated bodies, subjecting the extruded bodies alternately to currents of dry heated air and of cold air to remove both surface and occluded moisture, breaking the bodies thus dried into substantially uniform drillable lengths, and screening the product thus formed to remove the fines.

9. In a process for forming plant nutrient salts into hard dense sections having greater density of surface than interior, the steps consisting in compressing a paste of said salts and their solutions into dense sections and treating said sections alternately, first with cold air followed by a treatment with heated air of low relative humidity thereby simultaneously increasing the solution of salts within said section, causing said solution to migrate to the surface thereof with vaporization of water from the said surface, then cooling said sections to cause crystallization of the so migrated solution in the microscopic interstices of the outer shell of said sections, repeating said alternate treatment until substantially all the hygroscopic water is removed.

10. In a process of producing a concentrated fertilizer comprised of mixed plant nutrient salts, the steps which consist in grinding said mixture of salts to a fineness less than 80 mesh, providing sufficient moisture in the mixture to form a paste, and kneading the paste to a dough-like consistency for further treatment.

11. In a process of producing a concentrated fertilizer comprised of mixed plant nutrient salts, the steps which consist in grinding said mixture of salts to a fineness less than 80 mesh, providing from 5 to 10% moisture in the mixture to form a paste, and kneading the paste to a dough-like consistency for further treatment.

12. In a process of producing a concentrated fertilizer comprised of mixed potash, ammonia and phosphoric acid salts, the steps which consist in providing the potash salt in solid form, submitting the potash salt to a grinding action, concurrently reacting together ammonia and phosphoric acid in the presence of the potash salt and continuing grinding as the reaction proceeds until said resultant mixture of salts is ground to a fineness less than 80 mesh.

13. In a process of producing a concentrated fertilizer comprised of mixed potash, ammonia and phosphoric acid salts, the steps which consist in providing the potash salt in solid form, submitting the potash salt to a grinding action, concurrently reacting together ammonia and phosphoric acid in the presence of the potash salt and continuing grinding as the reaction proceeds until said resultant mixture of salts is ground to a fineness less than 80 mesh, providing sufficient moisture to form the mixture into a paste, and kneading the paste to a dough-like consistency for further treatment.

14. In a process of producing homogeneous fertilizer salt mixtures, the steps consisting of grinding said salts with sufficient water content to make with the solutions thereby formed a finely divided mass of salts and said solutions, and then kneading said mass with alternate application of pressure and release thereof until the said mass assumes a dough-like consistency.

15. In a process of producing homogeneous fertilizer salt mixtures in drillable form, the steps consisting in substantially dry grinding said salts to a fineness of approximately 5% on a 120 mesh screen and all through an 80 mesh screen, adding water and continuing with kneading action thereon until said salts with solutions formed with said water assumes a required consistency to make a smooth paste.

16. In a process of producing fertilizer containing ammonium phosphates, the steps which consist reacting together phosphoric acid and ammonia, continuously stirring the solid and liquid materials in formation until the said components are in chemical combination in a solid state and in a predetermined ratio, then subjecting the resulting solid mixture to kneading action of alternate pressure and release upon alternate portions of the mass of the mixture until said mass is in a homogeneous paste form throughout.

17. In a process of producing a fertilizer containing ammonium phosphates, the steps consisting in reacting phosphoric acid with ammonia in a gaseous state, continuously stirring until the said components are in chemical combination in a solid state and in a predetermined ratio, then subjecting the resulting solid mixture to a kneading action of alternate pressure and release thereof upon alternate portions of the mass of said solids, adding water thereto requisite to bring the total water content to 5 to 10% of said mass, and continuing said kneading action until said mass is in a homogeneous paste form throughout.

18. In a process of producing a fertilizer containing ammonium phosphates, the steps consisting in reacting phosphoric acid with ammonia in a gaseous state, continuously stirring until the said components are in chemical combination in a solid state and in a predetermined ratio, then subjecting the resulting solid mixture to a kneading action of alternate pressure and release thereof upon alternate portions of the mass of said solids, adding water thereto requisite to bring the total water content to 5 to 10% of said mass, and continuing said kneading action until said mass is in a homogeneous paste form throughout, the pressure employed in kneading being limited to that at which the salts and solutions thereof remain in homogeneous relation.

19. In a process of producing concentrated mixed plant nutrient salts including ammonium phosphates, the steps which comprise reacting ammonia and phosphoric acid under pressure and in a zone from which outside air is excluded, and grinding said salts as the reaction proceeds.

20. In a process of producing concentrated mixed plant nutrient salts including the phosphates of ammonia, the steps which comprise reacting ammonia and phosphoric acid under a pressure up to 100 pounds per square inch and in a zone from which outside air is excluded, and grinding said salts as the reaction proceeds.

21. In a process of producing concentrated mixed plant nutrient salts including the phosphates of ammonia, the steps which comprise reacting ammonia and phosphoric acid in a zone from which outside air is excluded, controlling the pressure and temperature in said zone to that at which said plant nutrient salts are stable, and grinding the salts as the reaction proceeds.

22. In a process of producing concentrated mixed plant nutrient salts including the phosphates of ammonia, the steps which comprise reacting ammonia and phosphoric acid in a zone from which outside air is excluded, controlling the pressure and temperature in said zone to that at which said plant nutrient salts are stable, grinding said plant nutrient salts as the reaction proceeds, evaporating the water introduced with the phosphoric acid by the heat of the reaction, and condensing and returning sufficient of the water to said zone to form a paste of the mixed salts.

23. In a process of producing concentrated mixed plant nutrient salts including the phosphates of ammonia, the steps which comprise reacting ammonia and phosphoric acid in a zone from which outside air is excluded, introducing water into said zone in a relatively fine state of subdivision to activate the ammonia, controlling the temperature and pressure in said zone to that at which said phosphates of ammonia are stable, grinding said plant nutrient salts as the reaction proceeds, incorporating sufficient moisture thereinto to form a paste, kneading the paste to a dough-like consistency, forming the paste into compact drillable particles, and drying the particles.

BETHUNE G. KLUGH.